US 12,490,299 B2

(12) United States Patent
Wu et al.

(10) Patent No.: US 12,490,299 B2
(45) Date of Patent: Dec. 2, 2025

(54) DISCONTINUOUS TRANSMISSION IN SHARED CHANNEL OCCUPANCY TIME FOR SIDELINK COMMUNICATION IN UNLICENSED SPECTRUM

(71) Applicant: QUALCOMM Incorporated, San Diego, CA (US)

(72) Inventors: Shuanshuan Wu, San Diego, CA (US); Tao Luo, San Diego, CA (US); Peter Gaal, San Diego, CA (US); Xiaoxia Zhang, San Diego, CA (US); Arthur Gubeskys, San Diego, CA (US); Jing Sun, San Diego, CA (US); Juan Montojo, San Diego, CA (US); Gene Wesley Marsh, San Diego, CA (US); Stelios Stefanatos, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/997,481

(22) PCT Filed: Jun. 24, 2021

(86) PCT No.: PCT/US2021/070771
§ 371 (c)(1),
(2) Date: Oct. 28, 2022

(87) PCT Pub. No.: WO2021/263284
PCT Pub. Date: Dec. 30, 2021

(65) Prior Publication Data
US 2023/0171803 A1    Jun. 1, 2023

(30) Foreign Application Priority Data
Jun. 24, 2020  (GR) .............................. 20200100370

(51) Int. Cl.
*H04W 74/0808*   (2024.01)
*H04W 72/0446*   (2023.01)
(Continued)

(52) U.S. Cl.
CPC ... *H04W 74/0808* (2013.01); *H04W 72/0446* (2013.01); *H04W 72/52* (2023.01); *H04W 76/28* (2018.02)

(58) Field of Classification Search
None
See application file for complete search history.

(56) References Cited

U.S. PATENT DOCUMENTS 10,779,308 B2    9/2020  Patil et al.
2020/0037343 A1  1/2020  He et al.
(Continued)

FOREIGN PATENT DOCUMENTS

WO    2018031172 A1    2/2018
WO    2020024854 A1    2/2020
WO    2020091569 A1    5/2020

OTHER PUBLICATIONS

Co-pending U.S. Appl. No. 17/997,358, inventor Wu; Shuanshuan, filed on Oct. 27, 2022.
(Continued)

*Primary Examiner* — Anh Ngoc M Nguyen
(74) *Attorney, Agent, or Firm* — Harrity & Harrity, LLP

(57) ABSTRACT

Various aspects of the present disclosure generally relate to wireless communication. In some aspects, a user equipment may transmit, in a first slot within a channel occupancy time (COT), a first communication; determine whether one or more transmission criteria are satisfied for transmission of a second communication in a second slot within the COT; and selectively transmit the second communication in the second slot within the COT based at least in part on a result of (Continued)

determining whether the one or more transmission criteria are satisfied. Numerous other aspects are provided.

20 Claims, 7 Drawing Sheets

(51) Int. Cl.
*H04W 72/52* (2023.01)
*H04W 76/28* (2018.01)

(56) References Cited

U.S. PATENT DOCUMENTS

2020/0154471 A1 5/2020 Sun et al.
2021/0368351 A1* 11/2021 Cui .................... H04W 74/002

OTHER PUBLICATIONS

Co-pending U.S. Appl. No. 17/997,478, inventor Wu; Shuanshuan, filed on Oct. 28, 2022.
Co-pending U.S. Appl. No. 17/996,584, filed Oct. 19, 2022.
Co-pending U.S. Appl. No. 17/996,587, filed Oct. 19, 2022.
International Search Report and Written Opinion—PCT/US2021/070771—ISA/EPO—Oct. 8, 2021.

* cited by examiner

DISCONTINUOUS TRANSMISSION IN SHARED CHANNEL OCCUPANCY TIME FOR SIDELINK COMMUNICATION IN UNLICENSED SPECTRUM

CROSS-REFERENCE TO RELATED APPLICATIONS

This Patent Application is a 371 National Phase of PCT Application No. PCT/US2021/070771, filed Jun. 24, 2021, entitled "DISCONTINUOUS TRANSMISSION IN SHARED CHANNEL OCCUPANCY TIME FOR SIDELINK COMMUNICATION IN UNLICENSED SPECTRUM," and claims priority to Greece Patent Application Serial No. 20200100370, filed on Jun. 24, 2020, entitled "DISCONTINUOUS TRANSMISSION IN SHARED CHANNEL OCCUPANCY TIME FOR SIDELINK COMMUNICATION IN UNLICENSED SPECTRUM," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for discontinuous transmission in shared channel occupancy time for sidelink communication in unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some communications systems, a user equipment (UE) may perform a channel sensing procedure to determine whether a channel is available for communication. To determine whether a resource is an available resource in a channel, the UE may monitor and decode transmissions on the channel and perform measurements on the channel. A resource may be classified as available if the resource has not been reserved or if the resource has been reserved by another UE, but a measurement associated with the other UE is below a threshold.

When a packet arrives for transmission (or when resource selection has been triggered), the UE may determine a sensing window (in the past), determine a usage of the sensing window and resource reservations indicated by sidelink control information (SCI) decoded in the sensing window based at least in part on decoding and measurement of the sensing window, and identify subsequent available resources in a resource selection window (in the future). The UE may select a resource from resources that have been identified as available in the resource selection window.

When a plurality of UEs share a set of resources in unlicensed spectrum for sidelink communication, a set of resources may be defined by channel occupancy associated with a channel occupancy time (COT). In this case, a first UE may use a channel sensing procedure to select a resource and reserve the resource for channel occupancy. The first UE may remain in the channel occupancy for a period defined by the COT. During the channel occupancy time, the first UE may have exclusive use of a particular resource or may selectively share the particular resource with other UEs.

However, in some cases, a UE may have packets or transport blocks for transmission, but may not be configured to transmit the packets or transport blocks using a continuous set of resources. In these cases, a configuration of channel occupancy and an associated COT may prevent the UE from transmitting without, for example, reacquiring channel occupancy.

Some aspects described herein enable discontinuous transmission for sidelink communication in unlicensed spectrum. For example, after transmitting in a first slot, a UE may transmit in a second slot that is discontinuous with the first slot. Whether the UE may transmit in the second slot without reacquiring channel occupancy may be based at least in part on whether the UE has performed a channel sensing technique for the second slot, a transmission priority for a transmission in the second slot, whether the transmission in the second slot is a retransmission, or a congestion level measured in the sidelink channel, among other examples. In this way, the UE may determine that a resource is available for transmission in the second slot within the channel occupancy even though the resource is not continuous with a resource in the first slot. Furthermore, by transmitting in the second slot based at least in part on determining that the one or more transmission criteria are satisfied, the UE avoids interference with other UEs or other devices, thereby avoiding dropped communications.

In some aspects, a method of wireless communication performed by a UE includes transmitting, in a first slot within a COT, a first communication; determining whether one or more transmission criteria are satisfied for transmission of a second communication in a second slot within the COT; and selectively transmitting the second communication in the second slot within the COT based at least in part on a result of determining whether the one or more transmission criteria are satisfied.

In some aspects, a UE for wireless communication includes a memory and one or more processors coupled to the memory, the memory and the one or more processors configured to: transmit, in a first slot within a COT, a first communication; determine whether one or more transmission criteria are satisfied for transmission of a second communication in a second slot within the COT; and selectively transmit the second communication in the second slot within the COT based at least in part on a result of determining whether the one or more transmission criteria are satisfied.

In some aspects, a non-transitory computer-readable medium storing one or more instructions for wireless communication includes one or more instructions that, when executed by one or more processors of a UE, cause the one or more processors to: transmit, in a first slot within a COT, a first communication; determine whether one or more transmission criteria are satisfied for transmission of a second communication in a second slot within the COT; and selectively transmit the second communication in the second slot within the COT based at least in part on a result of determining whether the one or more transmission criteria are satisfied.

In some aspects, an apparatus for wireless communication includes means for transmitting, in a first slot within a COT, a first communication; means for determining whether one or more transmission criteria are satisfied for transmission of a second communication in a second slot within the COT; and means for selectively transmitting the second communication in the second slot within the COT based at least in part on a result of determining whether the one or more transmission criteria are satisfied.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
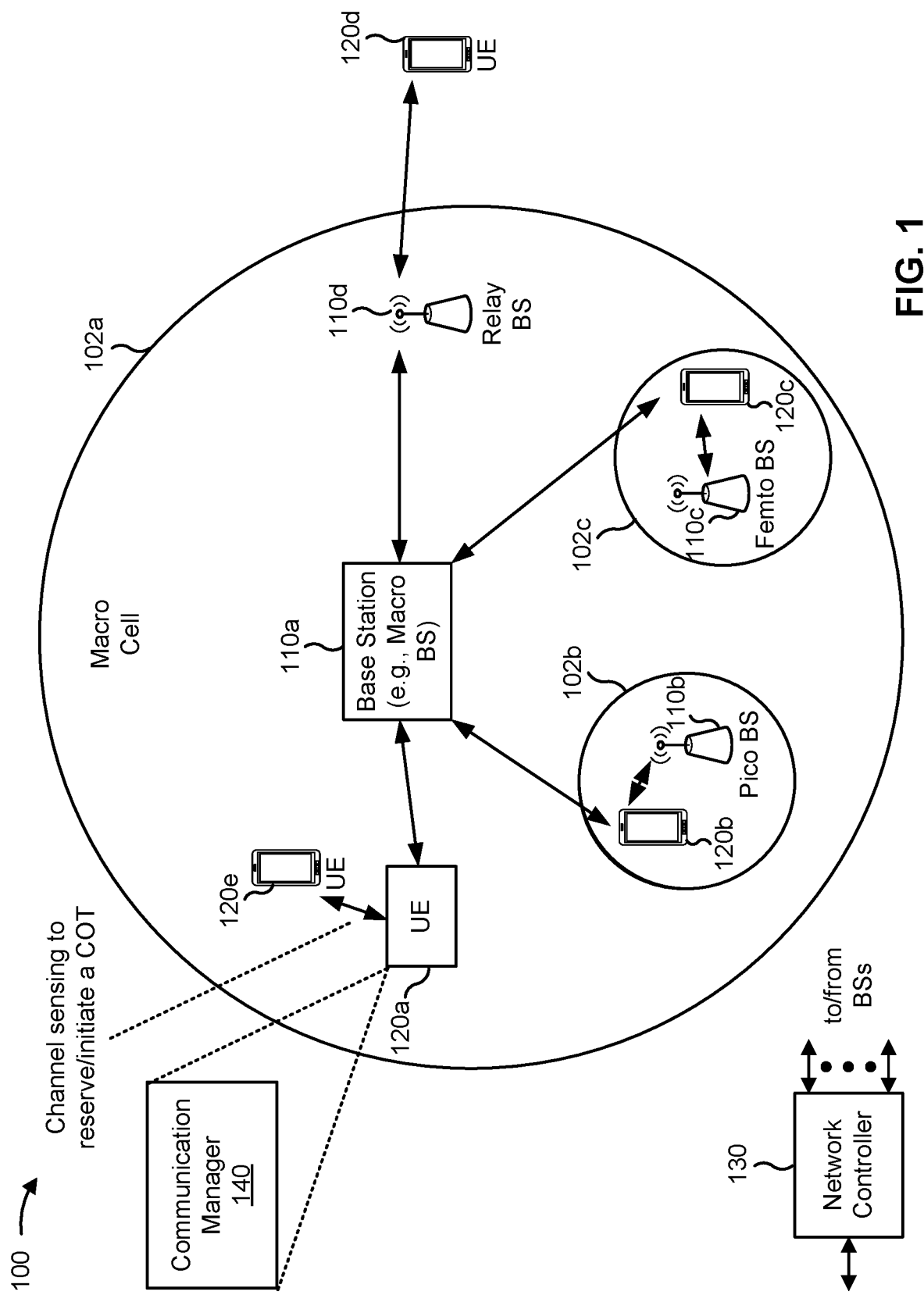
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNT3 (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispensed throughout the wireless network 100, and each UE 120 may be stationary or mobile. Some UEs 120 may communicate on a sidelink with other UEs by using a channel sensing procedure to determine whether resources are available in, for example, unlicensed spectrum. For example, a UE 120 may monitor for resource reservations to determine whether resources are available for one or more transmissions in a channel occupancy time (COT). A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz), Frequency bands falling within FR3 may inherit FR1 characteristics anchor FR2 characteristics, and thus may effectively extend features of FR1 and/or FR2 into rind-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, in a first slot within a channel occupancy time (COT), a first communication; determine whether one or more transmission criteria are satisfied for transmission of a second communication in a second slot within the COT; and selectively transmit the second communication in the second slot within the COT based at least in part on a result of determining whether the one or more transmission criteria are satisfied. Additionally, or alternatively, the communication manager 140 may perform one or more other operations described herein.

As indicated above, FIG. 1 is provided as an example. Other examples may differ from what is described with regard to FIG. 1.

Figure 2:
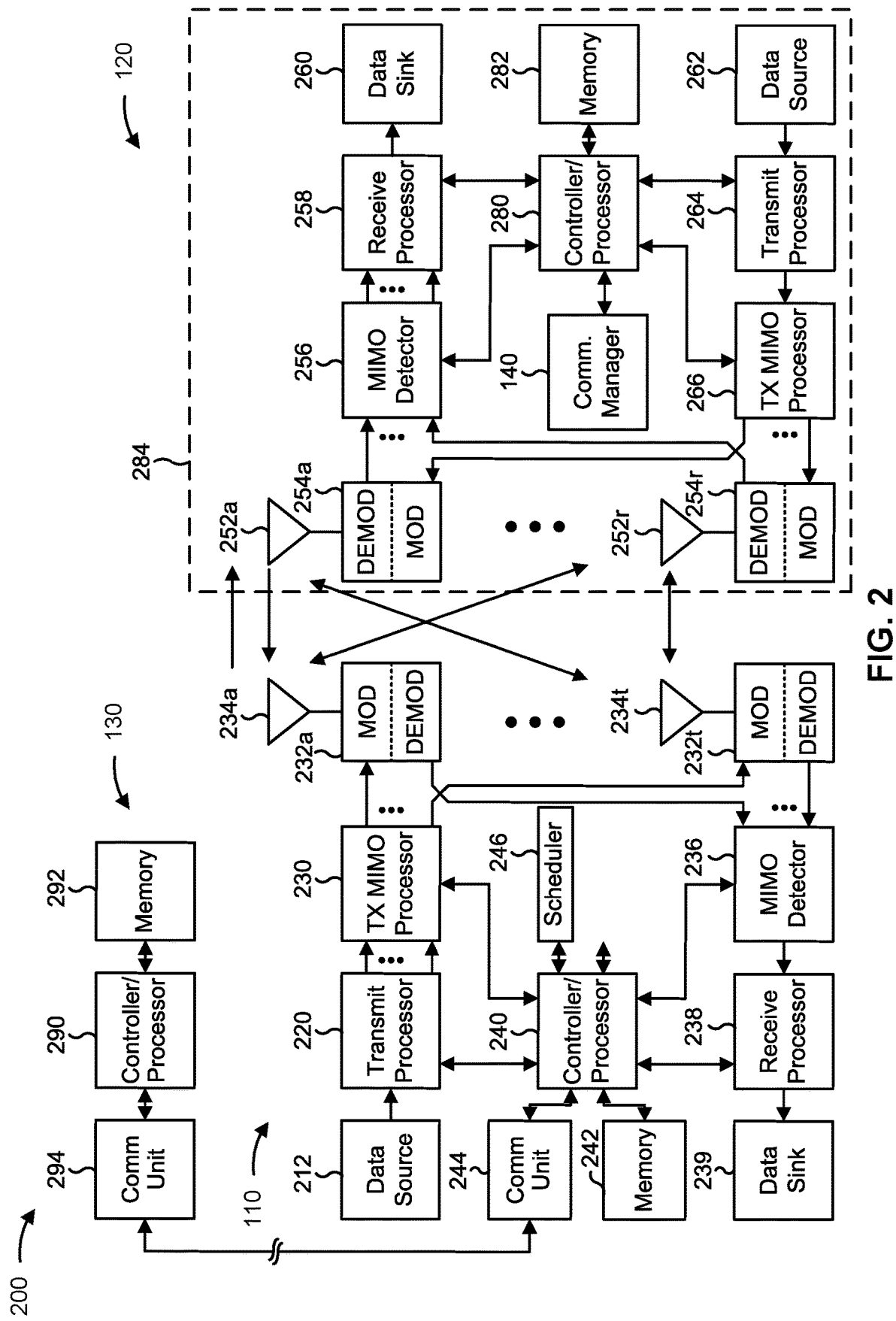
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the LTE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 10. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antennas) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-6).

The controller/processor 240 of the base station 110, the controller/processor 280 of the UE 120, and/or any other component(s) of FIG. 2 may perform one or more techniques associated with discontinuous transmission in shared channel occupancy time (COT) for sidelink communication in unlicensed spectrum, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE 120 includes means for transmitting, in a first slot within a COT, a first communication; means for determining whether one or more transmission criteria are satisfied for transmission of a second communication in a second slot within the COT; and/or means for selectively transmitting the second communication in the second slot within the COT based at least in part on a result of determining whether the one or more transmission criteria are satisfied. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
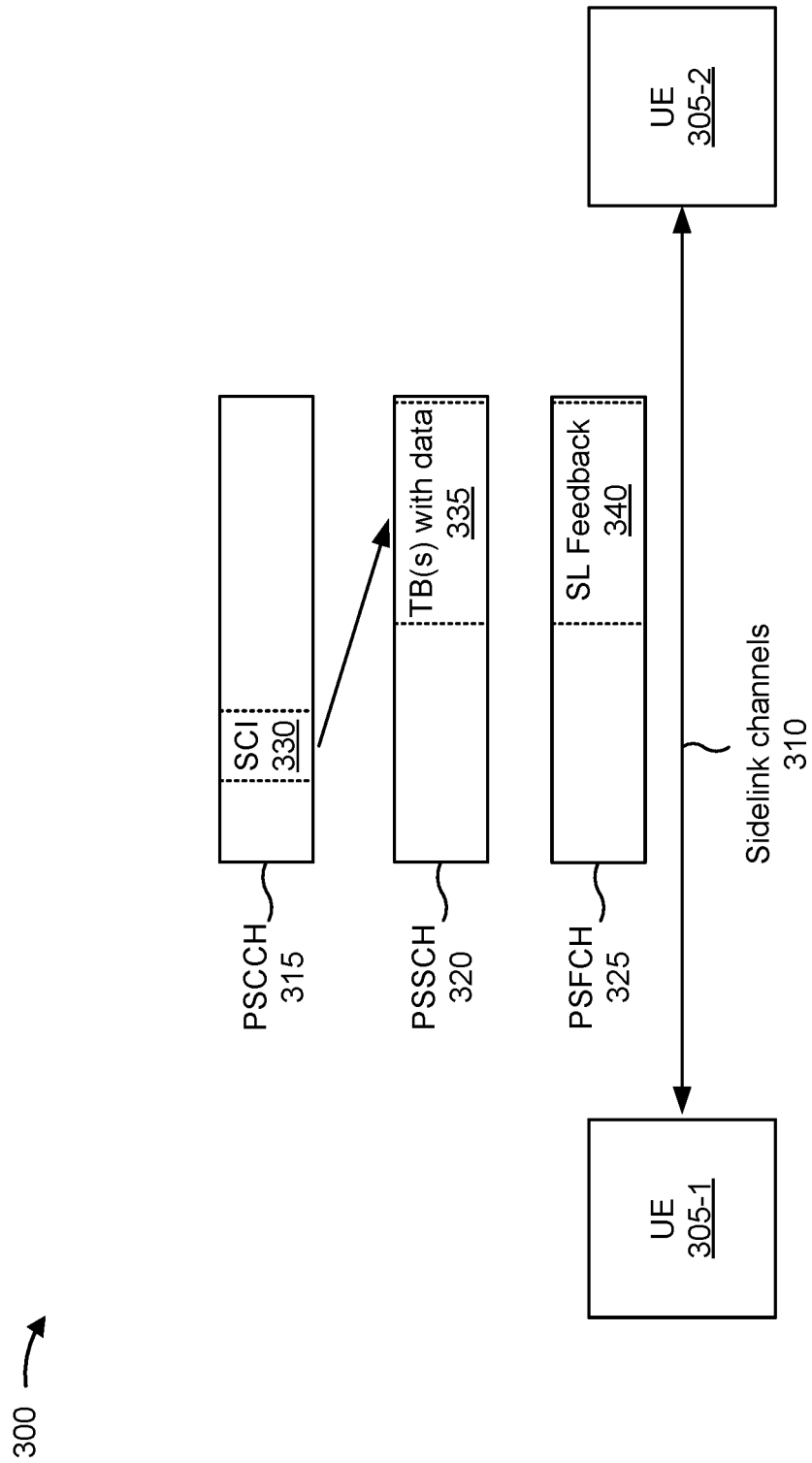
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for peer-to-peer (P2P) communications, device-to-device (D2D) communications, vehicle-to-everything (V2X) communications (e.g., which may include vehicle-to-vehicle (V2V) communications, vehicle-to-IoT (V2I) communications, vehicle-to-peer (V2P) communications, and/or the like), mesh networking, and/or the like. The UEs 305 (e.g., UE 305-1 and/or UE 305-2) may correspond to one or more other UEs described elsewhere herein, such as UE 120. The one or more sidelink channels 310 may use a PC5 interface and/or may operate in a high frequency band (e.g., the 5.9 gigahertz (GHz) band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSSCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PSSCH) and; or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSSCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

The one or more sidelink channels 310 may use resource pools. For example, a scheduling assignment (e.g., included in SCI 330) may be transmitted in sub-channels using specific resource blocks (RBs) across time. Data transmissions (e.g., on the PSSCH 320) associated with a scheduling assignment may occupy adjacent RBs in the same subframe as the scheduling assignment (e.g., using frequency division multiplexing). A scheduling assignment and associated data transmissions are not transmitted on adjacent RBs.

A UE 305 may operate using a transmission mode where resource selection and/or scheduling is performed by the UE 305 (e.g., rather than a base station 110). The UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH RSRQ parameter) associated with various sidelink channels, and/or the like, and may select a channel for transmission of a sidelink communication based at least in part on the measurement(s). As described in more detail herein, the UE 305 may perform resource selection to select a discontinuous set of resources (e.g., for a discontinuous set of transmissions).

The UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. A UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
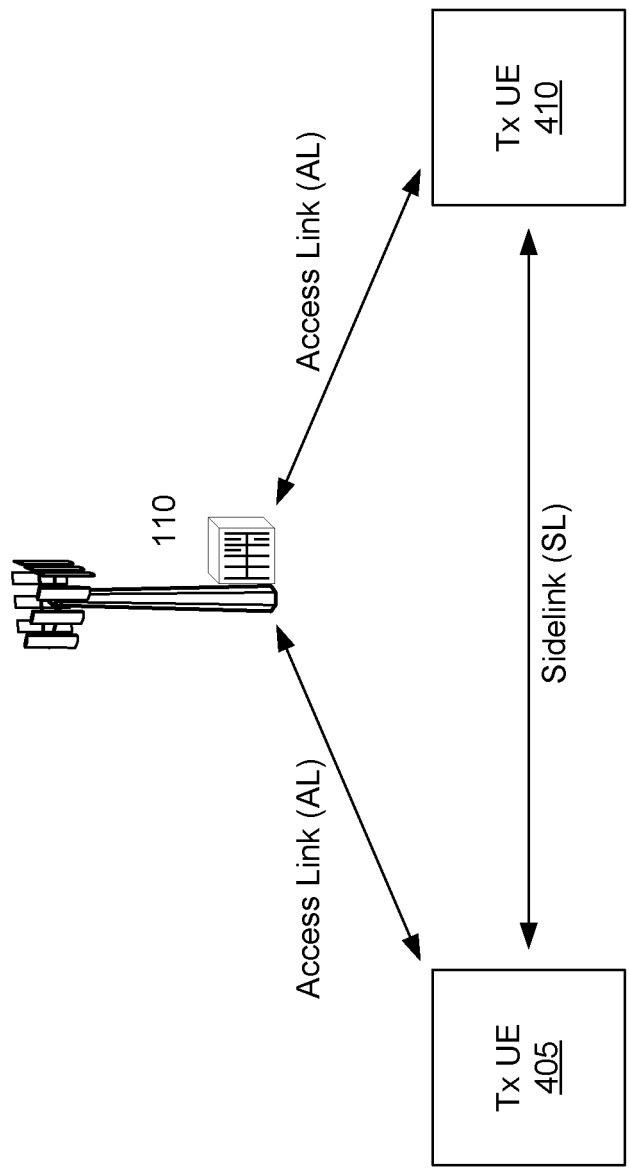
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

As described above, a UE may perform a channel sensing procedure to determine whether a channel is available for communication. For example, the UE may identify available resources (e.g., candidate resources) for a sidelink transmission and may select one or more resources from the available resources. The UE may reserve the one or more resources for the sidelink transmission and/or one or more subsequent transmissions. For example, the UE may reserve a first resource for transmission of a packet and a second resource for a retransmission of the packet (e.g., to improve reliability).

To determine whether a resource is an available resource, the UE may monitor and decode transmissions on a channel and perform measurements on the channel. For example, the UE may perform sidelink control information (SCI) decoding to determine if a resource in a future slot has been reserved (e.g., the SCI may indicate reservation of one or more resources in future slots). The UE may also perform a reference signal received power (RSRP) measurement in connection with SCI decoding to determine whether the measured RSRP based on the decoded SCI is below a threshold. A resource may be classified as available if the resource has not been reserved (e.g., there is no decoded SCI indicating reservation of the resource) or if the resource has been reserved by another UE, but a measured RSRP from the other UE is below an RSRP threshold. In this case, when a packet arrives for transmission (or when resource selection has been triggered), the UE may determine a sensing window (e.g., in the past), determine a usage of the sensing window and resource reservations indicated by SCIs decoded in the sensing window based at least in part on decoding and measurement of the sensing window, and identify subsequent available resources in a resource selection window (e.g., in the future) based at least in part on the usage of the sensing window and resource reservations indicated by SCIs in the sensing window. In other words, the UE may use decoding as well as RSRP measurements to determine whether a resource is reserved in the resource selection window by interpreting the resource reservation information carried by the decoded SCI and projecting the measured RSRP measurements from the sensing window to the reserved resources in the resource selection window. The UE may select resource from the resources that have been identified as available in the resource selection window.

When a plurality of UEs share a set of resources in unlicensed spectrum for sidelink communication, a set of resources may be defined by channel occupancy associated with a channel occupancy time (COT). In this case, a first UE may use a channel sensing procedure to select a resource and reserve the resource for channel occupancy. The first UE may remain in the channel occupancy for a period defined by the COT. During the channel occupancy, the first UE may have exclusive use of a particular resource or may selectively share the particular resource with other UEs. A COT may span a plurality of slots (e.g., 20 slots) and may include a plurality of resource blocks (RBs) across a plurality of frequencies. A COT may be initiated by a UE, as described above, by a BS, or by another type of wireless communication device using a channel sensing procedure, such as a listen-before-talk (LBT) procedure (e.g., based at least in part on a Type-1 channel access procedure).

When a UE initiates a channel occupancy, the UE may transmit during a particular subset of slots of a COT. For example, a UE may transmit a packet using a first slot in a COT and may retransmit the packet using a second slot of the COT. Additionally, or alternatively, the UE may transmit a plurality of different packets using a plurality of different slots in the COT. However, in some cases, a UE may have a plurality of packets, transport blocks, and/or the like for transmission, but may not be configured to transmit the plurality of packets, transport blocks, and/or the like using a continuous set of resources. For example, a UE may have a packet for transmission in a first slot, and may be configured to retransmit the packet in a second slot that is not sequential with the first slot. Additionally, or alternatively, the first slot and the second slot may be sequential, but may be separated by a threshold time gap. In these cases, a configuration of channel occupancy and an associated COT may prevent the UE from transmitting without, for example, reacquiring channel occupancy for a second transmission.

Some aspects described herein enable discontinuous transmission for sidelink communication in unlicensed spectrum. For example, after transmitting in a first slot, a UE may transmit in a second slot that is discontinuous with the first slot based at least in part on determining whether one or more transmission criteria are satisfied. In this case, the one or more transmission criteria may include whether the UE has performed a channel sensing technique for the second slot, a transmission priority for a transmission in the second slot, whether the transmission in the second slot is a retransmission, a congestion level measured in the sidelink channel, and/or the like. In this way, the UE may determine that a resource is available for transmission in the second slot within the channel occupancy even though the resource is not continuous with a resource in the first slot. Furthermore, by transmitting in the second slot based at least in part on determining that the one or more transmission criteria are satisfied, the UE avoids interference with other UEs or other devices (e.g., devices operating using Wi-Fi), thereby avoiding dropped communications.

Figure 5:
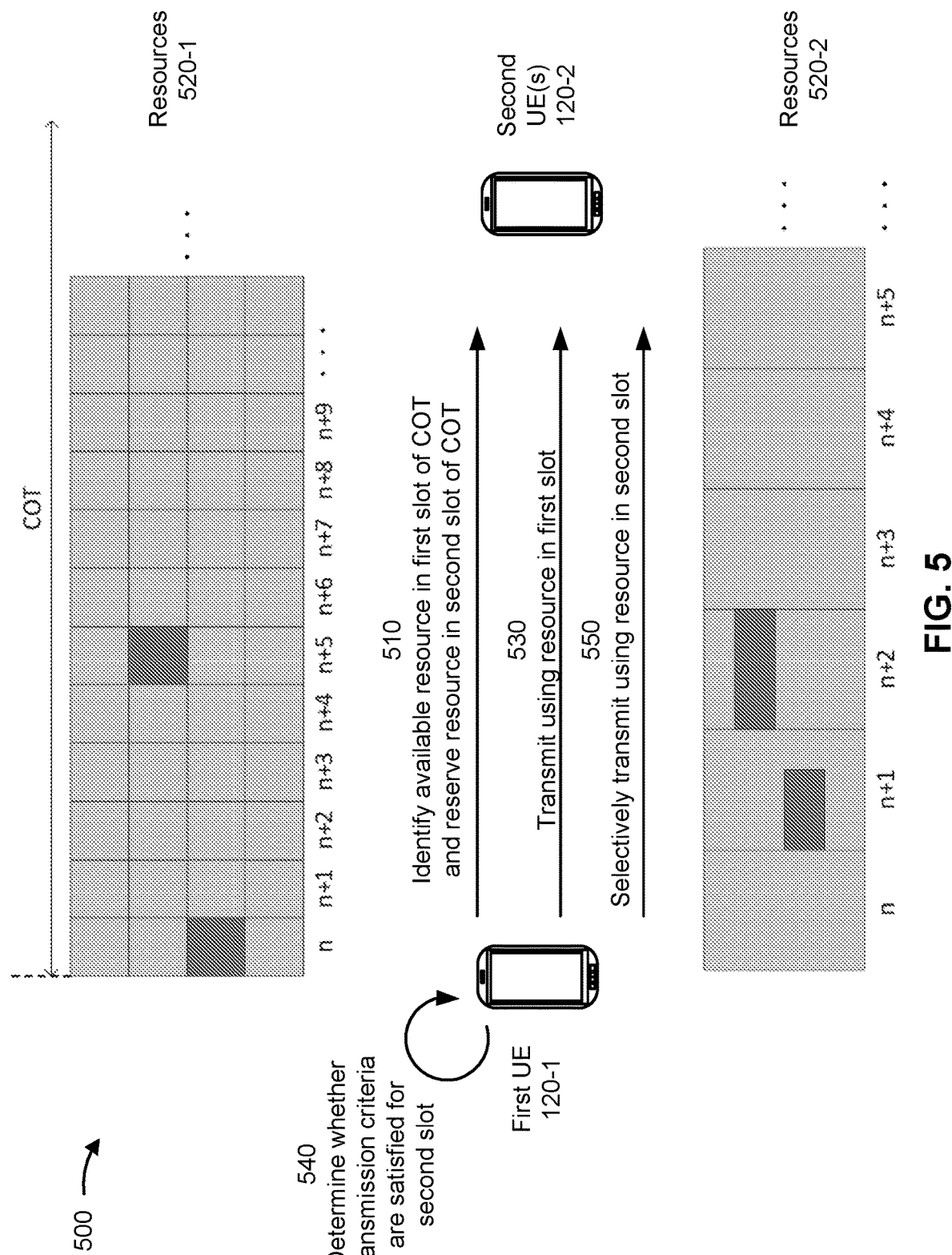
FIG. 5 is a diagram illustrating an example associated with discontinuous transmission in shared channel occupancy time for sidelink communication in unlicensed spectrum, in accordance with the present disclosure.

FIG. 5 is a diagram illustrating an example 500 associated with discontinuous transmission in shared channel occupancy time for sidelink communication in unlicensed spectrum, in accordance with the present disclosure. As shown in FIG. 5, example 500 includes a first UE 120-1 and a second UE 120-2.

As further shown in FIG. 5, and by reference number 510, first UE 120-1 may identify a first resource available in a first slot of a COT and a second resource available in a second slot of the COT. For example, first UE 120-1 may perform a channel sensing procedure to identify the first resource that is available for transmission and may transmit an indication of a reservation of the second resource that is available for transmission. Additionally, or alternatively, the first slot and the second slot may be non-reserved available resources of the COT. In some aspects, the second transmission may be a retransmission of the first transmission. For example, first UE 120-1 may identify the first resource to transmit a packet and the second resource for a retransmission of the packet (e.g., to improve reliability or to perform HARQ feedback based retransmission). Additionally, or alternatively, first UE 120-1 may identify the first resource for transmission of a first packet and the second resource for transmission of a second packet. As shown by reference number 530, first UE 120-1 may transmit using a resource in the first slot. For example, first UE 120-1 may transmit a packet to second UE 120-2 in the first slot.

In some aspects, the COT may be a shared COT. For example, first UE 120-1 may identify or initiate a shared COT (of a particular duration (e.g., 10 milliseconds (ms))) in which one or more other UEs 120 may also transmit. In some aspects, the first resource and the second resource may be discontinuous. For example, as shown by reference number 520-1, the first resource may be in a first slot, n, and the second resource may be in a second slot, n+k (k>1), that is not sequential with the first slot (e.g., the first transmission is in slot n and the second transmission is in slot n+5). Additionally, or alternatively, as shown by reference number 520-2, the first resource may be in sequential slots, but transmissions in the two slots may be separated by a threshold amount of time. For example, the first transmission may be in first resources of slot and the second transmission may be in second resources of slot n+2, but a time separation (e.g., a gap) between the first resources and the second resources may be greater than a threshold (e.g., greater than, for example, 16 µs).

As further shown in FIG. 5, and by reference numbers 540 and 550, first UE 120-1 may determine whether one or more transmission criteria are satisfied for the second slot and may selectively transmit using a resource in the second slot. For example, first UE 120-1 may perform a channel sensing procedure, determine that the channel sensing procedure is successful, and transmit to second UE 120-2 in a reserved resource in the second slot. In other words, the first UE 120-1 performs channel sensing for a particular amount of time before transmitting in the second slot, such as a Type 2A or 2B type channel access procedure and/or first UE 120-1 may transmit in the second slot in a resource that has been reserved by first UE 120-1 (e.g., if the measured energy during channel sensing is below a threshold), in some cases, first UE 120-1 may perform a channel sensing procedure, determine that the channel sensing procedure is successful, and transmit to second UE 120-2 in the second slot based on channel sensing outcomes (e.g., a resource in the second slot is identified as available by the channel sensing, the first UE may transmit in the resource). In this case, the channel sensing procedure may include, for example, a listen-before-talk (LBT) procedure (e.g., a Type-2 channel access procedure, a Category-2 LBT procedure, an LBT procedure without random backoff, and/or the like).

In some aspects, first UE 120-1 may perform the channel sensing procedure at a particular time. For example, to enable a transmission of a new packet or a re-transmission of a packet in the second slot, first UE 120-1 may perform channel sensing before a start of a reserved resource in the second slot. In this case, when channel sensing indicates that a channel or sub-channel thereof is free, first UE 120-1 may transmit in the channel or sub-channel, in some aspects, performing the channel sensing procedure may include performing an energy measurement within a sensing window of a pre-configured duration, as described above. For example, there may be a gap preceding transmission in the second slot (e.g., the gap may be at the beginning of the second slot, or may be at the end of the previous slot) and UEs 120 sharing the channel occupancy may refrain from transmitting during the gap, so the first UE may perform channel sensing (e.g., Type 2A/2B type channel access as specified in 3GPP) in the gap. In this case, the UEs 120 may transmit in the second slot in which a measured energy determined during channel sensing is below an energy threshold.

Additionally, or alternatively, first UE 120-1 may determine whether a priority of a transmission in the second slot satisfies a threshold. For example, when a second transmission in the second slot has the same priority or a higher priority than a first transmission in the first slot, first UE 120-1 may transmit in the second slot of the COT. Additionally, or alternatively, when the second transmission is a retransmission of the first transmission, first UE 120-1 may transmit in the second slot of the COT.

Additionally, or alternatively, when first UE 120-1 determines that a measured congestion level of a channel, in which channel occupancy is occurring, is less than a threshold (e.g., a channel busy ratio (CBR) is less than a threshold), first UE 120-1 may transmit in the second slot of the COT. For example, when first UE 120-1 detects greater than a threshold level of congestion, first UE 120-1 may determine that congestion level in the channel is high and may forgo transmitting. In contrast, when first UE 120-1 detects less than or equal to a threshold level of congestion, first UE 120-1 may determine that congestion level is low and first UE 120-1 may transmit in the second slot. In some aspects, first UE 120-1 may perform a CBR measurement, a received signal strength indicator (RSSI) determination, and/or the like over a particular duration of time to determine a level of congestion.

As indicated above, FIG. 5 is provided as an example. Other examples may differ from what is described with respect to FIG. 5.

Figure 6:
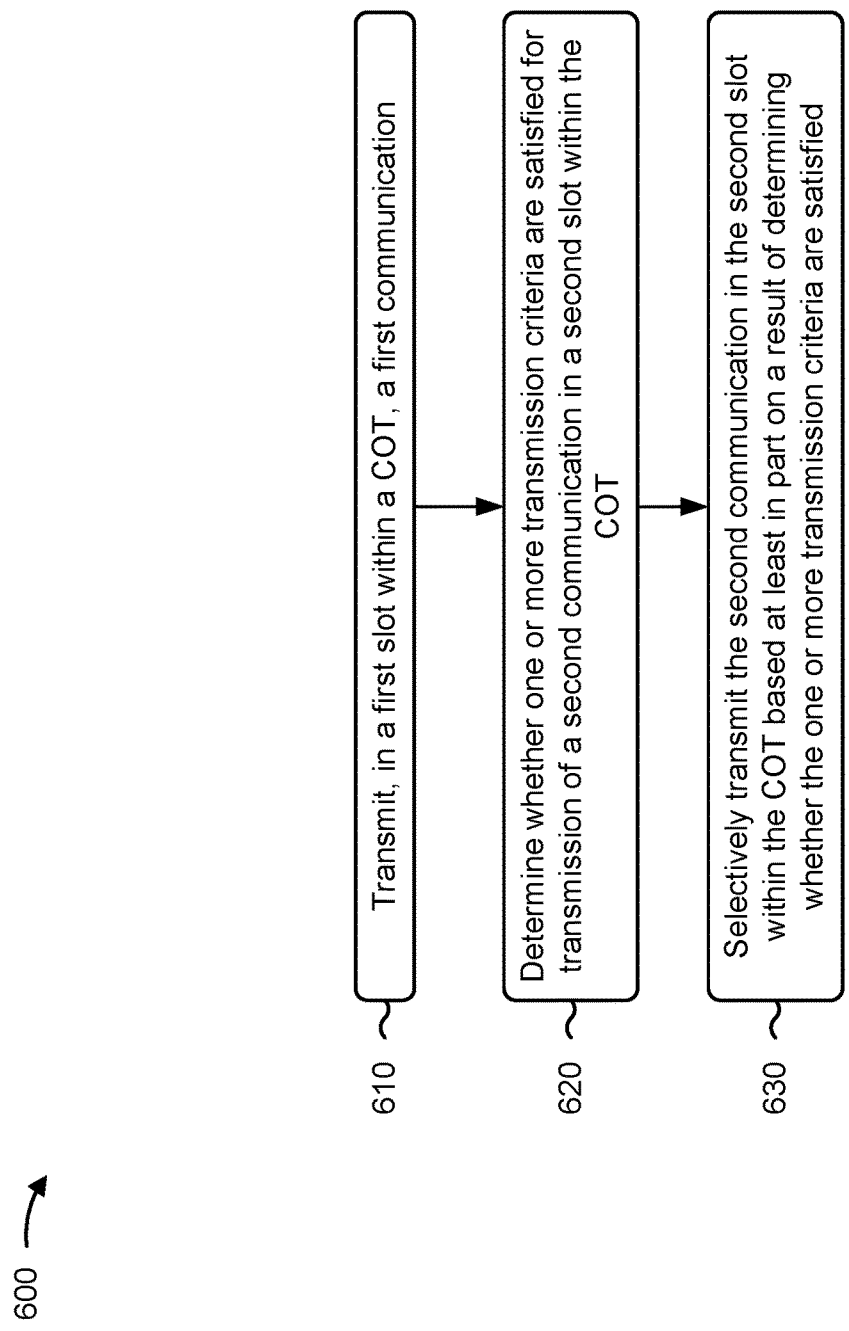
FIG. 6 is a diagram illustrating an example process associated with discontinuous transmission in shared channel occupancy time for sidelink communication in unlicensed spectrum, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with discontinuous transmission in shared channel occupancy time for sidelink communication in unlicensed spectrum.

As shown in FIG. 6, in some aspects, process 600 may include transmitting, in a first slot within a COT, a first communication (block 610). For example, the UE (e.g., using receive processor 258, transmit processor 264, controller/processor 280, memory 282, and/or the like) may transmit, in a first slot within a COT, a first communication, as described above.

As further shown in FIG. 6, in some aspects, process 600 may include determining whether one or more transmission criteria are satisfied for transmission of a second communication in a second slot within the COT (block 620). For example, the UE (e.g., using receive processor 258, transmit processor 264, controller/processor 280, memory 282, and/or the like) may determine whether one or more transmission criteria are satisfied for transmission of a second communication in a second slot within the COT, as described above.

As further shown in FIG. 6, in some aspects, process 600 may include selectively transmitting the second communication in the second slot within the COT based at least in part on a result of determining whether the one or more transmission criteria are satisfied (block 630). For example, the UE (e.g., using receive processor 258, transmit processor 264, controller/processor 280, memory 282, and/or the like) may selectively transmit the second communication in the second slot within the COT based at least in part on a result of determining whether the one or more transmission criteria are satisfied, as described above.

Process 600 may include additional aspects, such as any single aspect or any combination of aspects described below and/or in connection with one or more other processes described elsewhere herein.

In a first aspect, determining whether the one or more transmission criteria are satisfied includes determining whether a sensing-based channel access procedure is complete for the second slot.

In a second aspect, alone or in combination with the first aspect, determining whether the one or more transmission criteria are satisfied includes determining whether to transmit the second communication in the second slot based at least in part on an outcome of the sensing-based channel access procedure.

In a third aspect, alone or in combination with one or more of the first and second aspects, determining whether the one or more transmission criteria are satisfied includes determining whether the second communication is associated with a second priority greater than or equal to a first priority of the first communication.

In a fourth aspect, alone or in combination with one or more of the first through third aspects, determining whether the one or more transmission criteria are satisfied includes determining whether the second communication is a retransmission of the first communication.

In a fifth aspect, alone or in combination with one or more of the first through fourth aspects, determining whether the one or more transmission criteria are satisfied includes determining whether a congestion level threshold is satisfied.

In a sixth aspect, alone or in combination with one or more of the first through fifth aspects, the congestion level threshold is a channel busy ratio threshold.

In a seventh aspect, alone or in combination with one or more of the first through sixth aspects, transmission of the first communication and transmission of the second communication are separated by at least a threshold duration.

In an eighth aspect, alone or in combination with one or more of the first through seventh aspects, the first slot and the second slot are separated by at least one slot.

In a ninth aspect, alone or in combination with one or more of the first through eighth aspects, the first slot and the second slot are consecutive slots separated by at least the threshold duration.

In a tenth aspect, alone or in combination with one or more of the first through ninth aspects, determining whether the one or more transmission criteria are satisfied includes determining whether a resource in the second slot is reserved for transmission of the second communication.

In an eleventh aspect, alone or in combination with one or more of the first through tenth aspects, process 600 includes determining a first resource in the first slot for transmitting the first communication during a COT acquisition procedure, and indicating a reservation of a second resource in the second slot for transmitting the second communication during the COT acquisition procedure.

In a twelfth aspect, alone or in combination with one or more of the first through eleventh aspects, selectively transmitting the second communication includes selectively transmitting the second communication based at least in part on a result of the channel sensing procedure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
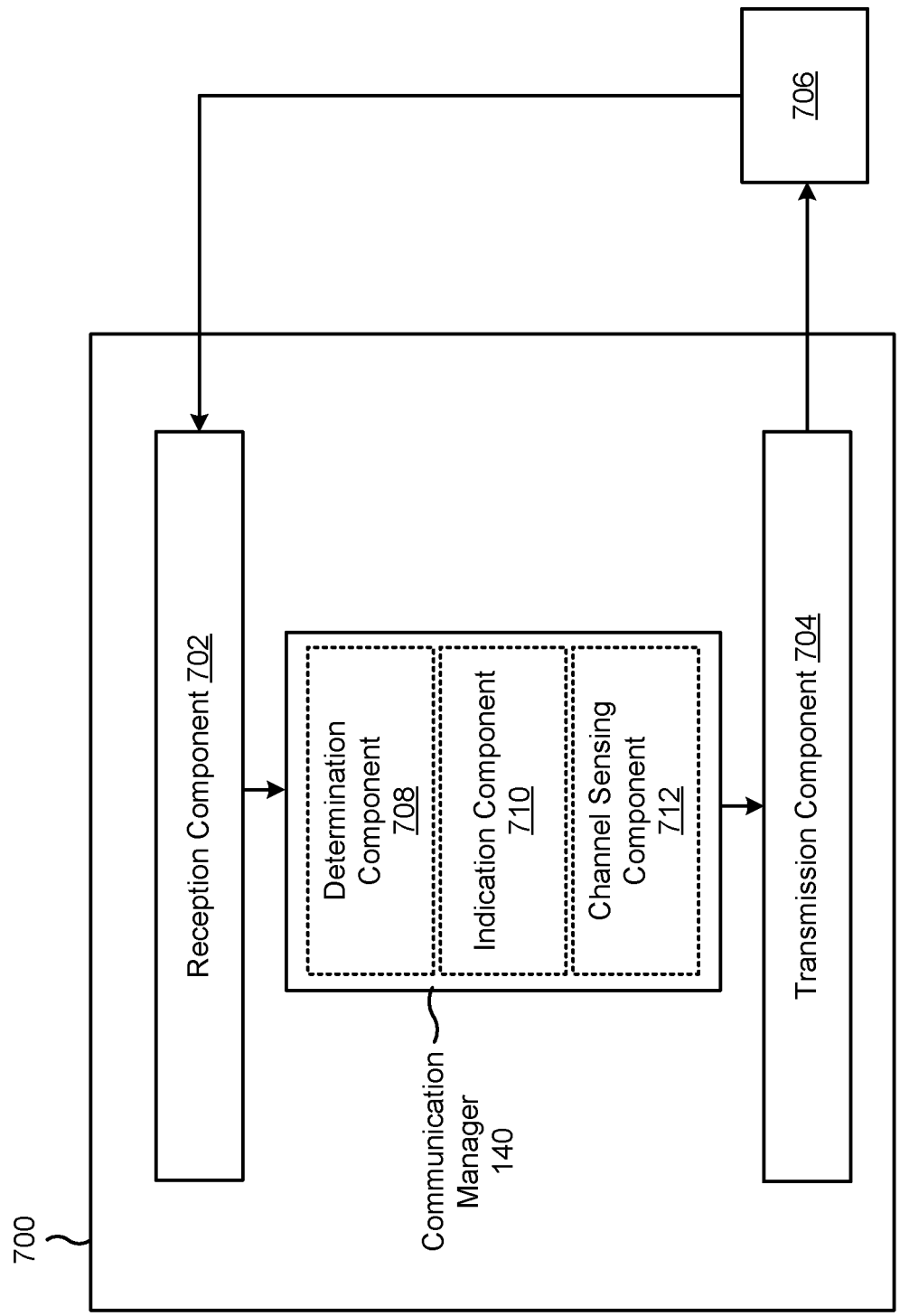
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a determination component 708, an indication component 710, or a channel sensing component 712, among other examples.

In some aspects, the apparatus 700 may be configured to perform one or more operations described herein in connection with FIG. 5. Additionally, or alternatively, the apparatus 700 may be configured to perform one or more processes described herein, such as process 600. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The transmission component 704 may transmit, in a first slot within a channel occupancy time (COT), a first communication. The determination component 708 may determine whether one or more transmission criteria are satisfied for transmission of a second communication in a second slot within the COT. The transmission component 704 may selectively transmit the second communication in the second slot within the COT based at least in part on a result of determining whether the one or more transmission criteria are satisfied.

The determination component 708 may determine a first resource in the first slot for transmitting the first communication. The indication component 710 may indicate a reservation of a second resource in the second slot for transmitting the second communication during the COT acquisition procedure. The channel sensing component 712 may perform a channel sensing procedure.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: transmitting, in a first slot within a channel occupancy time (COT), a first communication; determining whether one or more transmission criteria are satisfied for transmission of a second communication in a second slot within the COT; and selectively transmitting the second communication in the second slot within the COT based at least in part on a result of determining whether the one or more transmission criteria are satisfied.

Aspect 2: The method of Aspect 1, wherein determining whether the one or more transmission criteria are satisfied comprises: determining whether a sensing-based channel access procedure is complete for the second slot.

Aspect 3: The method of Aspect 2, wherein determining whether the one or more transmission criteria are satisfied comprises: determining whether to transmit the second communication in the second slot based at least in part on an outcome of the sensing-based channel access procedure.

Aspect 4: The method of any of Aspects 1 to 3, wherein determining whether the one or more transmission criteria are satisfied comprises: determining whether the second communication is associated with a second priority greater than or equal to a first priority of the first communication.

Aspect 5: The method of any of Aspects 1 to 4, wherein determining whether the one or more transmission criteria are satisfied comprises: determining whether the second communication is a retransmission of the first communication.

Aspect 6: The method of any of Aspects 1 to 5, wherein determining whether the one or more transmission criteria are satisfied comprises: determining whether a congestion level threshold is satisfied.

Aspect 7: The method of Aspect 6, wherein the congestion level threshold is a channel busy ratio threshold.

Aspect 8: The method of any of Aspects 1 to 7, wherein transmission of the first communication and transmission of the second communication are separated by at least a threshold duration.

Aspect 9: The method of Aspect 8, wherein the first slot and the second slot are separated by at least one slot.

Aspect 10: The method of Aspect 8, wherein the first slot and the second slot are consecutive slots separated by at least the threshold duration.

Aspect 11: The method of any of Aspects 1 to 10, wherein determining whether the one or more transmission criteria are satisfied comprises: determining whether a resource in the second slot is reserved for transmission of the second communication.

Aspect 12: The method of any of Aspects 1 to 11, further comprising: determining a first resource in the first slot for transmitting the first communication; and indicating a reservation of a second resource in the second slot for transmitting the second communication during the COT acquisition procedure.

Aspect 13: The method of any of Aspects 1 to 12, further comprising: performing a channel sensing procedure; and wherein selectively transmitting the second communication comprises: selectively transmitting the second communication based at least in part on a result of the channel sensing procedure wherein selectively transmitting the second communication comprises: selectively transmitting the second communication based at least in part on a result of the channel sensing procedure.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for perform ng the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or mote of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
  at least one memory; and
  one or more processors, coupled to the at least one memory, and configured to:
    transmit, in a first slot within a channel occupancy time (COT), a first communication;
    determine whether one or more transmission criteria are satisfied for transmission of a second communication in a second slot within the COT; and
    selectively transmit the second communication in the second slot within the COT based at least in part on a result of determining whether the one or more transmission criteria are satisfied,
    wherein the one or more processors, to determine whether the one or more transmission criteria are satisfied, are configured to:
      determine whether the second communication is associated with a second priority greater than or equal to a first priority of the first communication; or
      determine whether the second communication is a retransmission of the first communication; or
      determine whether a congestion level threshold is satisfied; or
      determine whether a resource in the second slot is reserved for transmission of the second communication.

2. The UE of claim 1, wherein the one or more processors, to determine whether the one or more transmission criteria are satisfied, are configured to:
  determine whether the second communication is associated with the second priority greater than or equal to the first priority of the first communication.

3. The UE of claim 1, wherein the one or more processors, to determine whether the one or more transmission criteria are satisfied, are configured to:
  determine whether the second communication is the retransmission of the first communication.

4. The UE of claim 1, wherein the one or more processors, to determine whether the one or more transmission criteria are satisfied, are configured to:
  determine whether the congestion level threshold is satisfied.

5. The UE of claim 4, wherein the congestion level threshold is a channel busy ratio threshold.

6. The UE of claim 1, wherein transmission of the first communication and transmission of the second communication are separated by at least a threshold duration.

7. The UE of claim 6, wherein the first slot and the second slot are separated by at least one slot.

8. The UE of claim 6, wherein the first slot and the second slot are consecutive slots separated by at least the threshold duration.

9. The UE of claim 1, wherein the one or more processors, to determine whether the one or more transmission criteria are satisfied, are configured to:
  determine whether the resource in the second slot is reserved for transmission of the second communication.

10. The UE of claim 1, wherein the one or more processors are further configured to: perform a channel sensing procedure; and wherein the one or more processors, to selectively transmit the second communication, are configured to: selectively transmit the second communication based at least in part on a result of the channel sensing procedure.

11. A method of wireless communication performed by a user equipment (UE), comprising:
- transmitting, in a first slot within a channel occupancy time (COT), a first communication;
- determining whether one or more transmission criteria are satisfied for transmission of a second communication in a second slot within the COT; and
- selectively transmitting the second communication in the second slot within the COT based at least in part on a result of determining whether the one or more transmission criteria are satisfied,
- wherein determining whether the one or more transmission criteria are satisfied comprises:
  - determining whether the second communication is associated with a second priority greater than or equal to a first priority of the first communication; or
  - determining whether the second communication is a retransmission of the first communication; or
  - determining whether a congestion level threshold is satisfied; or
  - determining whether a resource in the second slot is reserved for transmission of the second communication.

12. The method of claim 11, wherein determining whether the one or more transmission criteria are satisfied comprises: determining whether the second communication is associated with the second priority greater than or equal to the first priority of the first communication.

13. The method of claim 11, wherein determining whether the one or more transmission criteria are satisfied comprises: determining whether the second communication is the retransmission of the first communication.

14. The method of claim 11, wherein determining whether the one or more transmission criteria are satisfied comprises: determining whether the congestion level threshold is satisfied.

15. The method of claim 14, wherein the congestion level threshold is a channel busy ratio threshold.

16. The method of claim 11, wherein transmission of the first communication and transmission of the second communication are separated by at least a threshold duration.

17. The method of claim 16, wherein the first slot and the second slot are separated by at least one slot.

18. The method of claim 16, wherein the first slot and the second slot are consecutive slots separated by at least the threshold duration.

19. The method of claim 11, wherein determining whether the one or more transmission criteria are satisfied comprises: determining whether the resource in the second slot is reserved for transmission of the second communication.

20. The method of claim 11, further comprising:
performing a channel sensing procedure; and
wherein selectively transmitting the second communication comprises:
- selectively transmitting the second communication based at least in part on a result of the channel sensing procedure.

* * * * *